May 10, 1927.
W. E. ABBOTT ET AL
MEANS FOR AUTOMATICALLY RELIEVING THE PRESSURE ON PRESSURE MEMBERS WHEN THE SAME ARE SUBJECTED TO UNDUE STRESS
Filed June 11, 1926
1,628,297
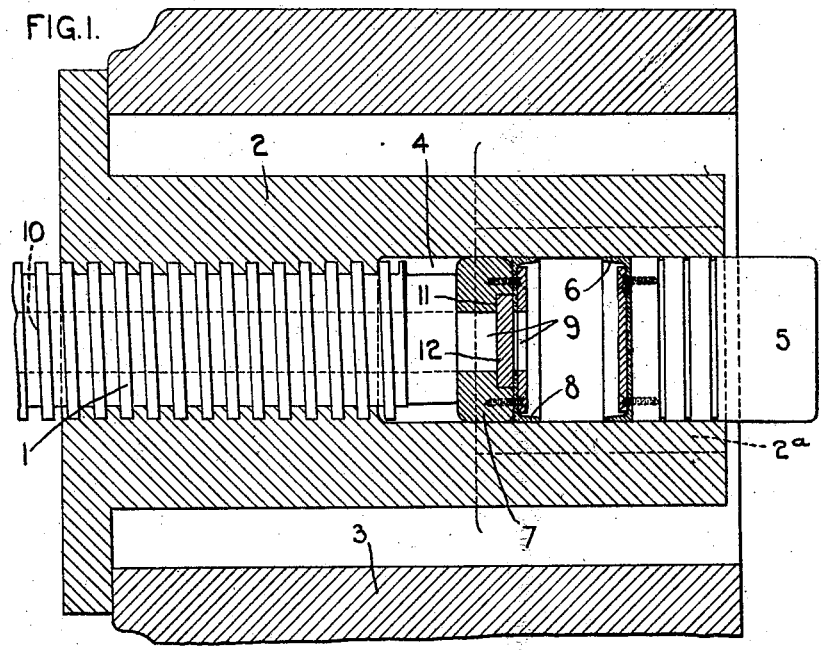
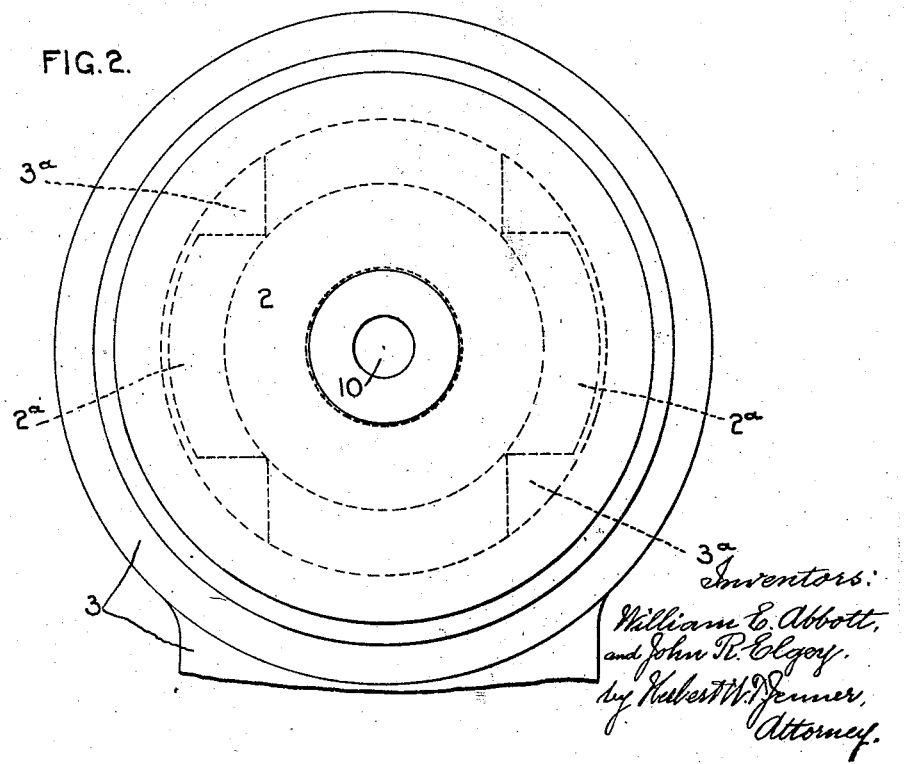

Patented May 10, 1927.

1,628,297

UNITED STATES PATENT OFFICE.

WILLIAM ERNEST ABBOTT, OF ROCHDALE, AND JOHN ROBERT ELGEY, OF LITTLE-BOROUGH, ENGLAND, ASSIGNORS TO GEORGE SPENCER, MOULTON & COMPANY, LIMITED, OF LONDON, ENGLAND, A COMPANY OF GREAT BRITAIN.

MEANS FOR AUTOMATICALLY RELIEVING THE PRESSURE ON PRESSURE MEMBERS WHEN THE SAME ARE SUBJECTED TO UNDUE STRESS.

Application filed June 11, 1926, Serial No. 115,412, and in Great Britain November 12, 1925.

This invention has reference to machines embodying members subjected to pressure and whilst the invention is particularly applicable to the rollers of rubber mills or other machines comprising pressure rollers it is not restricted to such applications but is capable of being used in numerous cases where pressure members are liable to be subjected to undue stress.

Rubber mills are liable to be severely strained and considerable damage to the same is often caused by hard foreign matter, such as metal bodies, being fed with the rubber between the rollers of the mill.

The rollers of such mills are adjusted towards each other by screwed spindles that work in internally screwed bushes mounted in the main frames and in order to prevent costly parts, such as the main frames, being broken under the stresses that arise upon foreign matters as above stated passing between the rollers it has already been proposed, and indeed it is at present customary, to so make and mount these bushes that they will fracture and release the pressure on the rollers before such stresses are such as to result in a breakage of the main frames or other costly part of the mill. It is, however, to be noted that these bushes are necessarily substantial articles that are certainly not cheap to produce being internally screwthreaded and machined to fit the bearings formed therefor in the mill frames.

The object of the present invention is to provide simple and efficient means whereby, upon undue stress on the rollers, the pressure thereon is automatically released without fracture of these bushes or any other part that will entail appreciable cost to replace.

For this purpose means according to the invention comprise a frangible body that normally closes an outlet passage from a chamber filled with grease or other suitable medium or liquid that is compressed by movement of the roller or pressure member consequent upon same being subjected to undue stress, the arrangement being such that the frangible body will be broken and allow the escape of the grease or other medium upon the pressure exceeding the predetermined pressure the frangible body is designed to withstand.

In an embodiment of the invention in its application to a rubber mill, there is interposed between each screwed spindle the manipulation of which effects the adjustment of the rollers relatively to each other, and the corresponding roller or roller bearing, a plunger working within a cylinder charged with grease or other suitable medium or liquid between the said plunger and a piston or block also working in said cylinder, the inner end of the screwed operating spindle abutting upon the said piston or block so that upon rotation of the screwed spindle, the piston or block is forced within the cylinder and, through the grease or liquid therein which is practically incompressible, forces the plunger outwardly and thereby effects movement of the roller. Frangible means of any suitable character are provided whereby the grease or liquid is released from said cylinder upon undue stress such as would arise upon the plunger moving inwardly by reason of the rollers of the mills being forced away from each other by the fact of a hard body being fed between them. The said releasing means constitute safety devices and may be of any suitable character. A simple, and at present the preferred form of such means, consists of a disc of frangible material such as cast metal, glass, or glazed earthenware placed over an axial boring formed through the piston or block and the screwed operating spindle, the said frangible disc being subjected on one side to the pressure of the grease or liquid within the cylinder so that upon undue pressure the disc will be fractured and the grease or liquid will consequently be free to escape through the boring of the operating spindle as the plunger moves inwardly, to relieve the pressure on the rollers of the mill. The frangible disc is of any desired predetermined thickness to withstand a given load.

A specific construction of an arrangement embodying the invention as applied to a rubber mill is illustrated in the accompanying drawings, Fig. 1 being a longitudinal section and Fig. 2 an end view.

The screwed roller adjusting spindle 1 works as usual in an internally screwed bush 2 that is removably mounted in the usual way in the mill frame 3, that is to say the bush is formed with laterally extending lugs 2ª which engage, after the manner of a bayonet joint, behind lugs 3ª projecting inwardly from the bore of the hole in the mill frame 3 within which the bush 2 is arranged. The internal screw thread of the bush extends from the outer end of the bush to about midway of the length thereof and, beyond the termination of the screw thread to the inner end of the bush, the bush is bored out to form a cylinder within which is fitted a plunger that extends through the inner end of the bush and bears at its outer end on the bearing, not shown, of the roller to be adjusted. Fitted on the inner end of the plunger 5 is a leather cup 6. Also arranged to work in the cylindrically bored portion 4 of the bush 2 is a short piston or block 7 fitted with a leather cup 8, this piston and the leather cup having a central hole 9 formed therethrough in alignment with an axial bore 10 formed through the operating spindle 1. The face of the piston or block 7 bearing the leather cup 8 is formed with a recess 11 and inserted in said recess is a frangible disc 12 of suitable material, such as cast iron, that closes the hole 9 formed in the piston and thereby seals the space in the cylindrical bore 4 of the bush between the piston or block 7 and the plunger 5. The said space is filled with grease or other suitable medium or liquid hereinafter referred to as grease.

The arrangement is such that upon screwing up the spindle 1 the piston or block 7 is moved in the cylindrical bore 4 and consequently moves the plunger 5 outwardly through the relatively incompressible body of grease between the piston or block 7 and plunger 5. The mill roller is thereby adjusted. Should undue pressure be exerted on the plunger 5 in an inward direction, such as would be the case upon a hard foreign body passing between the rollers of the mill, such pressure will be exerted through the grease on the frangible disc 12 which will consequently break when the predetermined load for which the disc is designed is exceeded so that the grease will then be forced through the axial boring 10 of the spindle 1, whereupon the mill rollers will be immediately released from pressure. It is then a simple matter to release the obstructing body from between the rollers, insert a new disc 12 within the piston or block 7, recharge the cylindrical bore 4 of the bush 2 with grease between the piston or block 7 and plunger 5 and again adjust the rollers as desired. It will be appreciated that the cost of the frangible disc 12 is practically negligible.

The distance between the leather cups 6 and 8 is such that when the disc 12 is fractured the plunger 5 can move inwardly sufficient to enable the gear wheels on the ends of the rollers to move out of mesh.

It is to be understood that the invention is not restricted in its application to the rollers of rubber mills but that it can be applied to other machines comprising pressure members or rollers in association with which it is desired to provide means for ensuring that undue stresses on the same shall not result in damage to the machine.

What we claim is:—

1. A pressure relieving device, comprising a support provided with a screwthreaded hole and a pressure chamber for fluid; a screw for applying pressure engaging with the said hole and having an outlet for the fluid, a piston slidable in the pressure chamber and bearing against the end of the screw and having a longitudinal passage, an imperforate disk of frangible material normally closing the said passage, and a plunger slidable in the pressure chamber and operated by the pressure therein.

2. A pressure relief device as set forth in claim 1, the said outlet and longitudinal passage being arranged axially in line with each other and upon the axis of the said screw and pressure chamber.

3. A pressure relieving device as set forth in claim 1, the said piston and plunger being provided with leather packing cups secured to their adjacent faces.

In testimony whereof we affix our signatures.

WILLIAM ERNEST ABBOTT.
JOHN ROBERT ELGEY.